United States Patent Office 2,992,166
Patented July 11, 1961

2,992,166
DIAGNOSTIC COMPOSITION
Walter Sigg, Zurich, Emil Külling, Schaffhausen, and Niklaus Schafflutzel, Herblingen, Schaffhausen, Switzerland, assignors to Cilag-Chemie Aktiengesellschaft (Cilag-Chemie Societe Anonyme), (Cilag-Chemie Limited), a Swiss company
No Drawing. Filed Nov. 4, 1958, Ser. No. 771,725
Claims priority, application Switzerland Nov. 5, 1957
6 Claims. (Cl. 167—84.5)

The present invention relates to a diagnostic composition to be administered perorally for the determination of gastric acidity.

The diagnostic composition contains as gastric acid indicating dye an azo derivative from the class of a 3-aryl-2,6-diamino-pyridine and an amphoteric substance, which is little soluble in water and in dilute mineral acids and the isoelectric point of which lies at a pH below 7.

Segal, Miller and Morton describe in Proc. Soc. Exptl. Biol. and Med. (1950), vol. 74, pp. 218 ctd., a tubeless method for the determination of gastric acidity. According to this method, quinine is bound to a cation exchange resin. This resin-quinine complex is administered perorally. The quinine is released by the hydrochloric acid present in the stomach and excreted in the urine. The quinine has to be extracted from the urine with the help of ether and its quantity determined fluorophotometrically; this method possesses some substantial defects, as the fluorophotometer necessitated by it, being a special instrument, is not a standard item in the laboratory of the practitioner.

It has already been suggested to use 3-phenylazo-2,6-diamino-pyridine as gastric acid diagnostic composition, by loading a cation exchanger with the said substance (compare French Patent No. 1,122,988 and British Patent No. 779,303). Experiments with this preparation have, however, shown it to posesss various defects, such as for instance difficulty in the practical application, as, due to the poor binding ability of the exchanger in comparison to the 3-phenylazo-2,6-diamino-pyridine, too great quantities have to be ingested. The release of the dye is unsafe and slow. The values thus obtained permit no clear differentiation of the prevailing conditions.

It was now surprisingly found that a combination of an azodye from the class of a 3-arylazo-2,6-diamino-pyridine with an amphoteric substance, which complies with the aforementioned requirements, excludes the said disadvantages. It is on the contrary possible already 1½ hours after ingesting the diagnostic composition claimed by the present invention to prove the presence of gastric acid by the colouration in the urine. The intensity of the urine colouration permits the differentiation: anacidity/subacidity/normacidity.

As already mentioned, the dye to be used is an azo derivative from the class of a 3-aryl-azo-2,6-diamino-pyridine. It is possible to use either the 3-phenylazo-2,6-diamino-pyridine itself or a derivative thereof containing no acid groups, such as for instance a 3-(p-lower alkyl-phenylazo)- or a 3-(p - lower alkoxy - phenylazo)- 2,6-diamino-pyridine.

Best suited as amphoteric substances, which are insoluble in water and in dilute mineral acids (by dilute mineral acids is meant 1N-hydrochloric acid) and the isoelectric point of which lies at a pH below 7, is a certain class of proteins, mainly vegetable proteins. Such proteins must, of course, be absolutely non-toxic for the human being. We prefer to use zein.

Proteins, the isoelectric point of which lies at a pH below 7 have been examined by F. A. Csonka et al. [J. Am. Chem. Soc. Vol. 48, pp. 763–766 (1926)].

The following describes in what manner the said diagnostic composition is produced and the test performed:

(1) *Production of the diagnostic composition*

50 parts of 3-phenylazo-2,6-diamino-pyridine, 50 parts of zein, 2.5 parts of tragacanth and 2.5 parts of gum arabic (acacia) are granulated in the usual manner. The resulting granulate is pressed into tablets with the aid of magnesium stearate and talcum and the tablets subsequently coated to dragées. One dragée thus contains 50 mg. of the dye, 50 mg. of zein and 2.5 parts each of tragacanth and of gum arabic.

The ratio of the dyestuff to the zein can, of course, be varied within certain limits. It was found that it is also possible to use with 50 parts of 3-phenylazo-2,6-diamino-pyridine for instance 40 parts of zein. The results obtained with this combination corresponded to the values found with the siphonage. As, however, a certain safety limit seems indicated, it is preferred to use with 50 parts of dye also 50 parts of zein.

It is, of course, also possible to use more than 50 parts of zein, for instance 50 parts of dye and 70 parts of zein. Also with this combination, the results obtained were in conformity with the values resulting from the siphonage. However, practical considerations call for limiting the increase of the quantity of zein. When using for instance 300 parts of zein with 50 parts of dye, the dragée will become already somewhat voluminous and people will then not like to take it (200 parts of zein to 50 parts of the dye is the upper limit).

As already indicated, it is possible to use instead of the 3-phenyl-azo-2,6-diamino-pyridine also another dye selected from the same class. A combination of 50 parts of 3-(p-methyl-phenylazo)-2,6-diamino-pyridine with 50 parts of zein has yielded such results as to find a 96% conformity between the test method claimed herein and the siphonage. A further combination of 60 parts of 3-(p-methoxy-phenylazo)-2,6 - diamino - pyridine with 50 parts of zein has also resulted in safe values.

Tragacanth and gum arabic have the task to mechanically make the mass (amphoteric substance and dye) stick together. Tragacanth can also be replaced by other, little swelling, but sticking substances, such as for instance a casein solution. Absolutely non-usable are starch, agar-agar, derivatives of gelatin and of cellulose, as these have a pronounced swelling effect.

(2) *Performance of the test*

The test is suitably performed in the early morning in absolutely fasting state, whereby particularly the taking of alcohol has to be strictly prohibited. During 8 hours previous to the test, no food or beverage shall be taken. On the previous day, no use shall be made of amidopyridine containing analgetics, certain laxatives, various urine colouring medicaments and food-stuffs. Physical strains shall be avoided during the test. Patients confined to bed are recommended not to keep continuously in the same position during the test.

(a) To begin the test, two caffeine tablets which are capable of activating secretion of gastric acid are ingested with one-half glass of water (approximately 50 cc.). Previous to that, the harn-bladder shall be voided. This urine is discarded as not being necessary for diagnostic purposes.

Thanks to the diuresis brought about by caffeine, the dye released in the normacid stomach is being excreted within 1½ hours in a sufficient concentration.

The gastric juice can also act acidly in the absence of hydrochloric acid, provided it contains lactic acid. Lactic acid is bound by caffeine within a short time.

(b) One hour after the ingestion of the caffeine tablets, the bladder is again voided and the urine saved for the control examination. Three of the test-dragées claimed by the present invention are now ingested; care has to be taken that the dragées are swallowed whole, without chewing them.

Thanks to the special preparation of the dragées, the dye is, with low pH-values, released quickly; the more the pH-values increase, the more slowly is it released. It is absorbed and secreted relatively fast. The composition of the test-dragées is adapted to the pH-conditions in the stomach in such manner as to permit a strong deviation of the quantities of dye released according to the various pH-values. The quantity of dye released in the normacid stomach allows 1½ hours after ingestion of the test-dragées claimed by the present invention the proof of a characteristic degree of discolouration in the urine. With subacid and anacid subjects, the dye is released by the dragées in the stomach to such a small extent that in the 1½ hours' urine, no or only very small quantities of the dye are traceable.

(c) The urine voided 1½ hours after ingestion of the test-dragées claimed herein is filled with water to 200 cc. and used for examination. The examination has to be performed without delay; it requires:

Test tubes of 11 mm. interior diameter, as the colour-scale is adapted to this thickness;

25% hydrochloric acid, with which concentration the colour-scale was standardised.

The addition of 25% hydrochloric acid to an equal amount of thus diluted urine (for example 5 cc. each) destroys almost entirely the genuine urine dyestuffs, as was proved by a test with a control specimen correspondingly diluted. The now more intensive red colouration is marked by a pure colour-tone which is easily comparable with a graded colour-scale. The colouration is caused by the formation of hydrochloric salts of 3-phenylazo-2,6-diamino-pyridine and its metabolites.

It is absolutely necessary that both the control specimen as well as the 1½ hours' urine are compared with the colour-scale immediately after treatment with hydrochloric acid, as by standing, the colour of the control urine deepens, whereas the 1½ hours' urine becomes a lighter colour.

Results with the test method described here above have already been published in the scientific literature; compare:

Bianchetti et al: "Clinical Experience With a New Tubeless Test for the Gastric Acidity (Gastrotest Cilag)," in Swiss Medical Weekly, vol. 88, No. 30, pp. 736–739 (1958);

Lienhard, P.: "The Significance of Anacid Gastritis to the Practitioner With Reference to Tubless Methods to Test Gastric Acidity," in Praxis, 47th year, No. 28, pp. 472–474 (May 10, 1958).

What we claim is:

1. A diagnostic composition for oral administration to determine gastric acidity, which comprises 3-phenylazo-2,6-diamino-pyridine and zein.

2. A diagnostic composition in tablet form for oral administration to determine gastric acidity, which comprises as active components 3-phenylazo-2,6-diamino-pyridine and zein.

3. A diagnostic composition in tablet form for oral administration to determine gastric acidity, comprising by weight 50 parts 3-phenylazo-2,6-diamino-pyridine and 40 to 200 parts zein.

4. A diagnostic composition in tablet form for oral administration to determine gastric acidity, comprising by weight 50 parts 3-phenylazo-2,6-diamino-pyridine and 50 parts zein.

5. A diagnostic composition for oral administration to determine gastric acidity, which comprises an azo derivative selected from the group of 3-phenylazo-2,6-diamino-pyridine, 3-(p-lower alkyl-phenylazo)-2,6-diamino-pyridine, and 3-(p-lower alkoxyphenylazo)-2,6-diamino-pyridine and zein.

6. In a process of determining gastric acidity by testing for coloration in the urine, the step of orally administering an azo derivative selected from the group consisting of 3-phenylazo-2,6-diamino-pyridine, 3-(p-lower alkyl-phenylazo)-2,6-diamino-pyridine, and 3-(p-lower alkoxyphenylazo)-2,6-diamino-pyridine, and zein.

References Cited in the file of this patent

UNITED STATES PATENTS

| 2,791,533 | Segal | May 7, 1957 |
| 2,794,786 | Segal | June 4, 1957 |

FOREIGN PATENTS

| 760,403 | Great Britain | Oct. 31, 1956 |
| 779,303 | Great Britain | July 17, 1957 |
| 1,122,988 | France | May 28, 1956 |

OTHER REFERENCES

Merck Index, Merck & Co., Rahway, N.J., 7th ed., 1960, pp. 481, 491.

Chem. Abs., vol. 45, 1951, p. 8645.

Bianchetti: Swiss Med. Weekly (Schweiz. Med. Woch) 88: 30, 1958, pp. 736–739.

Annals of the N.Y. Acad. of Sci., Ion Exchange Resins in Med. and Bio. Res., vol. 57, art. 3, Nov. 11, 1953, pp. 308–323.